United States Patent [19]
Scott

[11] 3,965,863
[45] June 29, 1976

[54] CHEMICAL LITTER UNIT

[76] Inventor: Harry M. Scott, 6472-A Warner Ave., Huntington Beach, Calif. 92647

[22] Filed: Apr. 7, 1975

[21] Appl. No.: 565,956

[52] U.S. Cl. ............................................. 119/1
[51] Int. Cl.² ...................................... A01K 29/00
[58] Field of Search ............ 119/1; 4/115, 116, 135, 4/138

[56] References Cited
UNITED STATES PATENTS

| | | | |
|---|---|---|---|
| 1,237,483 | 8/1917 | Darnall | 4/138 |
| 2,390,854 | 12/1945 | Thompson | 119/1 |
| 3,546,718 | 12/1970 | Minnitte | 4/116 |
| 3,822,671 | 7/1974 | Rosenberg | 119/1 |

Primary Examiner—J.N. Eskovitz
Attorney, Agent, or Firm—Knobbe, Martens, Hubbard, Olson & Bear

[57] ABSTRACT

A household pet litter unit for use primarily by domestic cats which not only eliminates undesirable odors, but also eliminates the need to replenish a litter material used by the cat when depositing excreta. The litter unit includes one chemically treated receiving area for liquid excreta, and a second chemical treated area for receipt of solid excreta. The litter material is non-absorbent which is continuously re-usable. The overall design of the litter unit has a sloping feature which directs the pet's use toward one end of the unit.

8 Claims, 4 Drawing Figures

CHEMICAL LITTER UNIT

BACKGROUND OF THE INVENTION

This invention relates to the field of sanitary devices for use by household pets in depositing waste material and more specifically is directed to use by household cats which inherently require some type of loose material for covering their excreta. In the typical household where the owners of a pet desire to have the animal remain indoors, it is necessary to provide some area for the cat to deposit waste material. Typically, an individual provides a box containing sand or some other type of litter material. Since sand does not provide any deodorizing capability to the smell of the excreta, a commonly used material is a chemically treated litter composition which has the ability not only to absorb some of the excreta, but also to help eliminate undesirable odors.

The primary disadvantage of these cat litter boxes containing a typical litter material is the fact that the litter material reaches a saturation stage, eventually causing an unpleasant smell. Therefore, the pet owner must continually discard the litter material and replace it with new litter material, causing considerable inconvenience for those animal owners living in apartments where the foul smelling used litter material must be carried outside for deposit. Typical household toilets are not designed to receive the litter material.

Another problem with the typically used litter boxes in the prior art is the disposal of solid excreta which tends to remain separated from the litter material. In many instances, if too much solid excreta is in the litter area, the litter material must be replenished even if otherwise it were not saturated with foul smelling liquid excreta.

SUMMARY OF THE INVENTION

The present invention comprises a pair of receiving areas each containing a chemical solution for the respective receipt of solid and liquid excreta of the household pet. Mounted over one of the receiving areas is a perforated tray holding a plurality of nonabsorbent chips or particles which the cat will use in his natural procedure of covering its waste material. The second receiving area is a holding tank into which solid excreta is placed by the use of some instrument such as a large fork. The holding tank is enclosed with a removable cap. The top of the holding tank is sloped, so that the cat will direct its use of the litter box in the area where the non-absorbent chips are located.

The use of the non-absorbent chips eliminates the need to constantly replenish the litter box with a litter material, because these chips do not become saturated with any liquid and can be periodically washed to prolong their use. This is a significant advantage to the cat owners living in apartments and more confined areas in a city, since it is not convenient to deposit the saturated litter material every few days. The solid excreta which is deposited on the non-absorbent chips can be removed by some type of tool and placed within the holding tank for later deposit when it is necessary to change the chemical solution below the chips which receives the liquid excreta. These chemical solutions containing the liquid and solid excreta can normally be placed within a typical household toilet for removal through the sewer system.

An alternate embodiment of the invention comprises the integral construction of a holding tank and a receptacle area wherein the upper part of the receptacle area adjacent the holding tank is designed to receive a typical single litter pan which most people use to hold litter material or sand as the pet toilet. The litter pan is attached securely above the receptacle area by easily removable fastening means. The pan may be of any size and can overlap the receptacle area; however, that portion of the pan which is directly over the receptacle area must be perforated with drainage holes in order to allow the liquid excreta to drain into the chemically treated solution in the receptacle area.

The present invention litter box is of a size generally compatible with the typical sizes used for litter boxes presently.

DETAILED DESCRIPTION OF THE INVENTION

Figure 1:
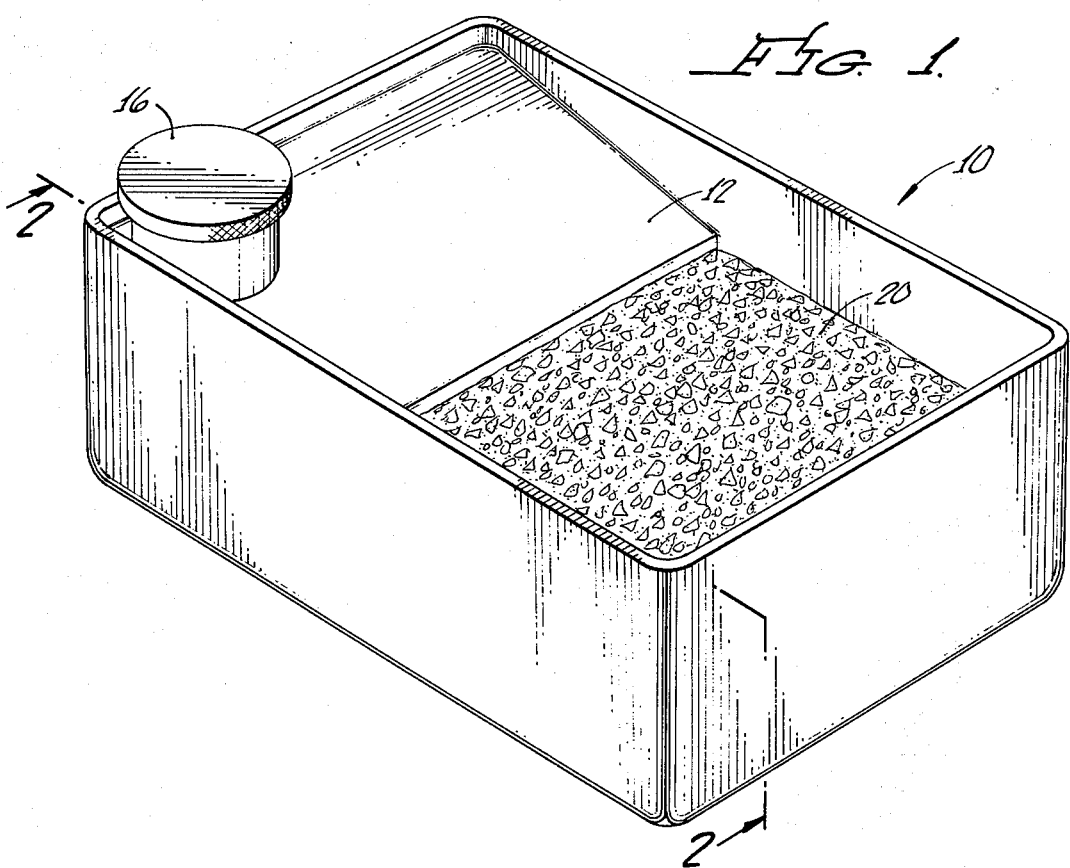
FIG. 1 is a perspective view of the invention.

The chemical litter unit invention 10 is shown in FIG. 1 having a holding tank 12 at one end and a litter tray 14 at the other end. The holding tank 12 has a removable cap 16 while the litter tray 14 has a series of perforations 18 and supports a plurality of nonabsorbent chips or particles 20.

Figure 2:
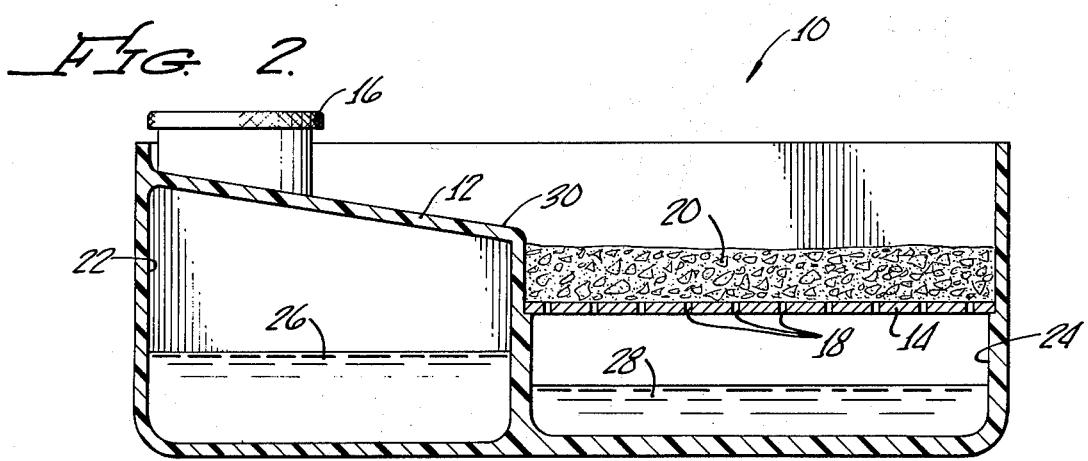
FIG. 2 is a sectional view taken along the line 2—2 in FIG. 1.

As shown in more detail in FIG. 2, the litter box 10 has a first receiving area 22 and a second receiving area 24. The first receiving area 22 is located within the holding tank 12 and contains a chemical solution 26. The litter or upper tray 14 is mounted over and above the second receiving area or lower tray 24 which contains a second chemical solution 28. The top surface 30 of the holding tank is sloped downward toward the second receiving area 24.

In the use of the litter box the cat will stand on the top surface 30 of the holding tank and on the particles or chips 20 to make a slight cavity in which it typically will deposit its excreta. Since the upper surface 30 of the holding tank 12 is sloping, the cat will direct its use of the litter box in the area of the litter tray or upper pan 14, because animals instinctively will not attempt to deposit their excreta uphill. If the animal deposits liquid excreta, it will flow down through the nonabsorbent particles 20 onto the litter tray 14 where it will drain through the perforations 18 into the second receiving area or lower pan 24. The liquid excreta will be absorbed by the chemical solution 28 which deodorizes the excreta.

If the excreta deposited is solid, the pet owner can use some type of tool or instrument to scoop up the solid excreta, remove the cap 16 off the holding tank 12 in order to place the solid excreta into the first receiving area 22. The chemical solution 26 within the holding tank 12 will receive the solid excreta and tend to eliminate its odor while also tending to decompose it from its solid state.

When it is necessary to remove the excreta saturated chemical solution 28, the litter tray 14 is removed along with the particles or chips 20. The litter box pan is carried to a toilet where the chemical solution 28 is dumped into the toilet. Furthermore, the chemical solution 26 within the holding tank 12 is also deposited after removing the sealing cap 16. Once the excreta saturated chemical solutions 26 and 28 are deposited, a fresh supply of chemical solution is placed within the respective first and second receiving areas 22 and 24. The litter tray 14 with the nonabsorbent chips 20 is replaced over the first receiving area 24. The cat litter box is then ready for use for a significant period of time depending upon how fast the chemical solutions 26 and 28 become saturated with excreta. Periodically, it may be necessary to wash or rinse the particles 20 and the tray 14. The invention is designed so that the particles will be reusable and will be essentially permanent, although some replacement might be desirable after several months or even a year's use.

Figure 3:
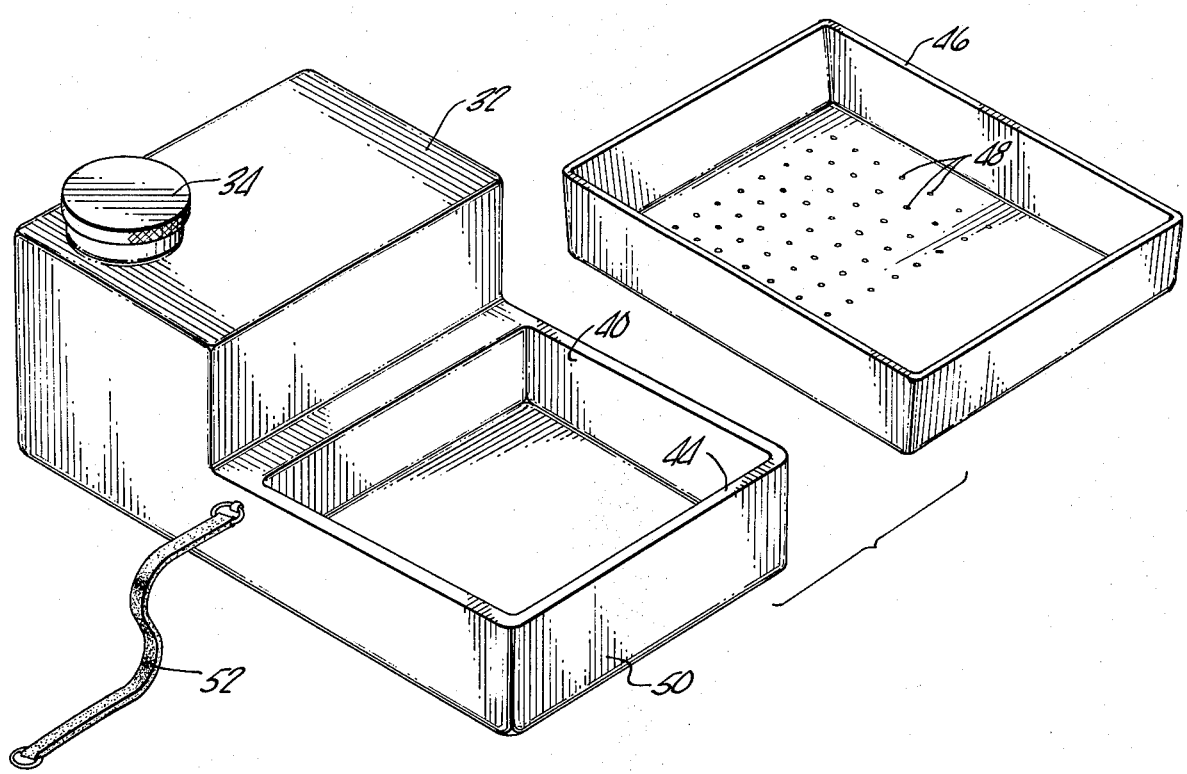
FIG. 3 is a perspective view of an alternate embodiment of the invention.
Figure 4:
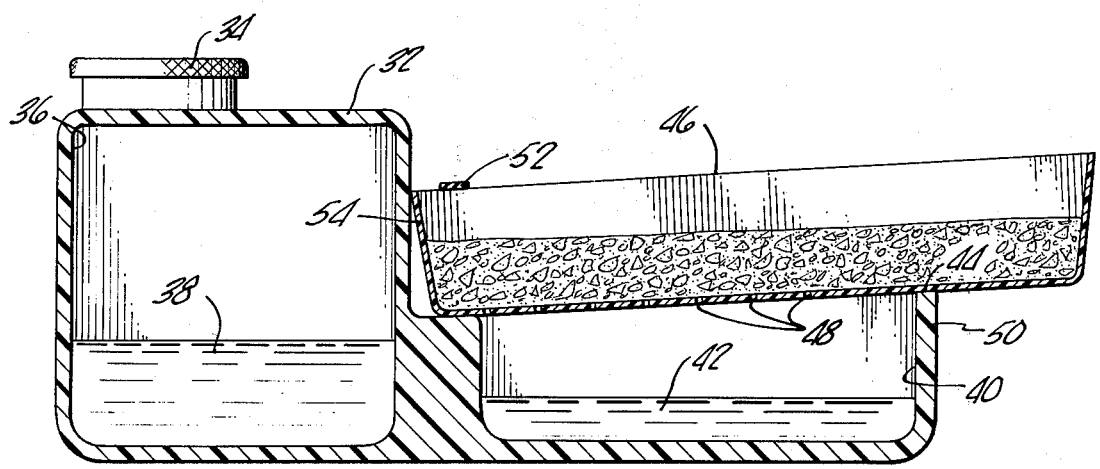
FIG. 4 is a sectional view taken along the line 4—4 in FIG. 3.

FIG. 3 shows an alternate embodiment of the invention having a holding tank 32 with a removable cap 34 to allow access to the holding tank receiving area 36 shown in FIG. 4. Located in the first receiving area 36 is a chemically treated solution 38 designed to receive the solid excreta of the pet in the same manner as described with respect to the holding tank 12 in the first embodiment of FIGS. 1 and 2. Integrally connected with the holding tank is a second receiving area or receptacle portion 40 which contains a chemically treated solution 42 for receipt of the liquid excreta from the pet. The upper perimeter edge 44 of the second receiving area 40 provides a support surface for receipt of a typical litter pan 46 which is presently being used as the pet toilet. This embodiment of the invention shown in FIGS. 3 and 4 allows the utilization of the existing pet toilet rather than discarding it completely. However, in order to make it compatible with the invention, it is necessary to incorporate a series of drainage holes 48 in that portion of the pan over the second receiving area 40 to allow the liquid excreta of the pet to drain into the second receiving area 40.

The pan 46 is placed on the support perimeter 44 of the second receiving area 40 as shown in FIG 4. It does not matter how large the pan is, since it can overhang the end wall 50 of the second receiving area 40. In order to secure the pan tightly to the second receiving area 40, a fastening means 52 is utilized which may incorporate an expandable spring or tension strap which extends over one end 54 of the pan 46. The strap 52 is secured to opposite sides of the integral holding tank and second receptacle area structure by hooks or any other acceptable fastening or securing mechanism which would allow for its easy removal. It also should be noted that there is a slight downward slope of the pan 46 toward the holding tank 32 in order to insure that the pet will use that portion of the pan which is essentially located over the second receiving area 40 regardless of the size of the pan which may be overlapping the end wall 50. As with the first embodiment shown in FIGS. 1 and 2, a plurality of non-absorbent particles or chips are placed in the litter pan 46 for the use of the pet when he is utilizing the pet toilet.

What is claimed is:

1. A chemical litter unit for a household pet comprising:
   a holding tank;
   a receptacle area attached adjacent said holding tank;
   a litter tray mounted above said receptacle area, said tray having a series of perforations; and
   a plurality of nonabsorbent chips located in said tray, said receptacle area containing a chemical solution for receipt of liquid excreta from said pet, said holding tank for receipt of solid excreta of said pet.

2. A chemical litter box for receipt of liquid and solid excreta from a household pet, said litter box comprising:
   a base tray;
   an upper tray mounted above and over said base tray, said upper tray having a series of perforations; and
   a plurality of nonabsorbent particles located in said upper tray and forming a layer within said upper tray for supporting said pet and for receiving said excreta, said base tray containing a chemical solution to eliminate odors of said liquid excreta draining from said upper tray into said base tray, said particles being reuseable requiring no replacement.

3. A household pet waste box comprising:
   a holding tank;
   a removable cap on said tank to allow the placement of solid excreta of said pet within said tank, said tank containing a chemical solution;
   an open top litter tray mounted adjacent said holding tank; and
   a litter material placed on said tray and supporting said pet when depositing said waste.

4. A chemical litter box for receipt of household pet excreta, said box comprising:
   a lower pan;
   an upper pan mounted above and over said lower pan, said upper pan having a series of perforations to allow drainage of liquid excreta from said upper pan to said lower pan;
   a plurality of reuseable nonabsorbent chips located in said upper pan to form a layer for supporting said pet and receiving said excreta; and
   a chemical solution located in said lower pan to deodorize said liquid excreta in said lower pan.

5. A chemical litter box for receipt of household pet excreta, said box comprising:
   a holding tank at one end of said box and having a top surface;
   a removable cap on said holding tank;
   a first chemical solution within said holding tank for receipt of solid excreta of said pet;
   a lower pan integrally attached to said holding tank adjacent the other end of said box;
   a second chemical solution located in said lower pan;
   an upper tray mounted over and above said lower pan, said upper tray having a series of perforations for drainage of liquid excreta of said pet into said lower pan, said second chemical solution deodorizing said liquid excreta; and
   a plurality of nonabsorbent chips located in said upper tray, said top surface of said holding tank being angled downward toward said other end of said box to promote said pet using said upper tray when depositing said solid and liquid excreta.

6. A sanitary disposal unit for a household pet, said unit comprising:
   a first receptacle area at one end of said unit;
   a first chemical solution in said first receptacle area for receipt of solid excreta of said pet;
   a second receptacle area adjacent said first receptacle area;
   a second chemical solution in said second receptacle area for receipt of liquid excreta of said pet;

a tray member mounted above said second receptacle area, said tray member having a series of perforations; and a plurality of nonabsorbent particles located in said tray member, said pet positioning itself on said tray to use said disposal unit, said particles being reuseable requiring no replacement.

7. A chemical litter unit for a household pet comprising:

a holding tank;

a receptacle area integrally attached adjacent said holding tank, said receptacle area containing a chemically treated solution for receipt of liquid excreta from said pet, said holding tank containing a chemically treated solution for receipt of solid excreta from said pet;

a support area located above said receptacle area for receipt of a litter tray; and fastening means mounted adjacent said holding tank for securing said tray to said support area on said receptacle area, said support area capable of receiving various sizes of said tray, said tray containing nonabsorbent chips and having a plurality of perforations in that portion located directly above said receiving area.

8. A sanitary disposal unit for a household pet, said unit comprising:

a holding tank defining a first receptacle area;

an open ended receiving unit integrally attached to said holding tank defining a second receptacle area;

a support surface located adjacent said open end of said receiving unit, said support surface being sloped slightly downward toward said holding tank; and fastening means removably mounted adjacent said holding tank, said support area capable of receiving variable sized litter trays, said fastening means securing any of said trays above said second receptacle area, said support surface causing said litter tray to slope downward slightly toward said holding tank.

* * * * *